(No Model.)
F. G. CURTIS.
PROCESS OF AND COMPOSITION FOR THE MANUFACTURE OF POROUS CUPS FOR ELECTRICAL BATTERIES.
No. 511,514. Patented Dec. 26, 1893.
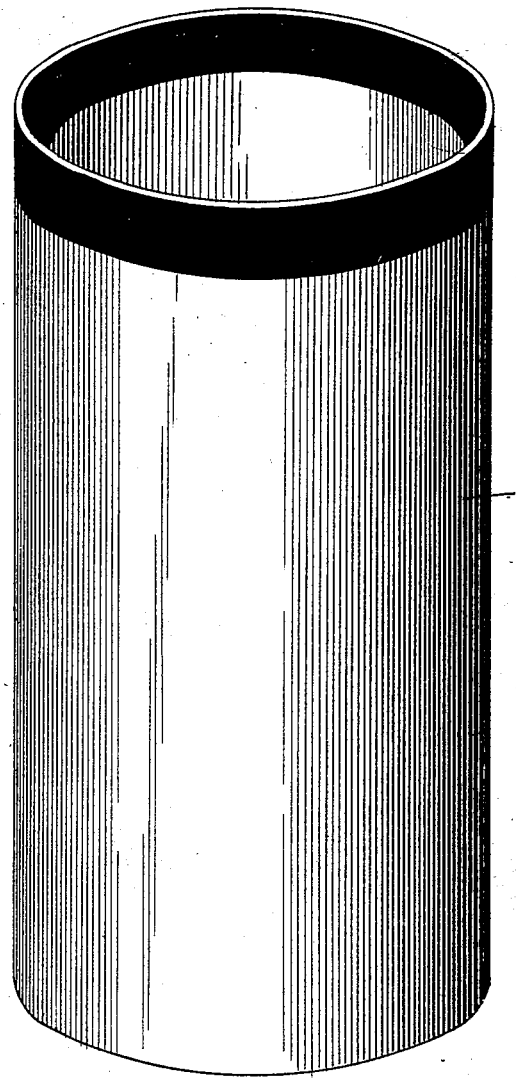
Witnesses:
Harry D. Rohrer.
Saml. J. Wallace,
Inventor:
Frank G. Curtis
By Fenora M. Dorsey
Attorneys.

UNITED STATES PATENT OFFICE.

FRANK G. CURTIS, OF PHILADELPHIA, PENNSYLVANIA.

PROCESS OF AND COMPOSITION FOR THE MANUFACTURE OF POROUS CUPS FOR ELECTRICAL BATTERIES.

SPECIFICATION forming part of Letters Patent No. 511,514, dated December 26, 1893.

Application filed February 13, 1893. Serial No. 462,156. (No specimens.)

*To all whom it may concern:*

Be it known that I, FRANK G. CURTIS, a citizen of the United States, residing at Philadelphia, in the county of Philadelphia and State of Pennsylvania, have invented certain new and useful Improvements in Processes of and Composition for the Manufacture of Porous Cups for Electrical Batteries; and I do declare the following to be a full, clear, and exact description of the invention, such as will enable others skilled in the art to which it appertains to make and use the same, reference being had to the accompanying drawing, and to the figures of reference marked thereon, which forms a part of this specification.

My invention relates to a new and useful process of manufacturing porous cups for primary batteries, and to a new and useful composition of matter for making the same, it having for its object to provide for the manufacture of a cup of small electrical resistance and at the same time of a high resistance to the passage of the exciting liquids, the mingling of which it is desirable to prevent in order to obviate local action on an open circuit, and also to decrease the consumption of zinc on a closed circuit and for this purpose my invention consists in the process and composition of matter which will be hereinafter more fully described and claimed.

Referring to the accompanying drawing which is a perspective view of a completed porous cup I will now describe my invention as follows: I take a very fine clay, the essential ingredient of which is silicate of aluminum and allow it to become quite dry, after which it is pulverized. This is then moistened with the following solution, viz: carbonate of ammonium, eight ounces; carbonate of potassium, four ounces; water, one gallon. A sufficiency of this solution having been added to a certain quantity of clay, it is thoroughly kneaded until the proper consistency for molding, after which it is shaped to the desired form and thickness, either in molds or on a lathe. Having thus been shaped the cups 5 are dried in the sun and finally baked in an oven, in which latter under the high temperature there found, the carbonate of ammonia is vaporized, and forms exceedingly small cavities within the walls of the cell. I also find that by the use of the above described solution for moistening the clay, the walls of the cup can be made much thinner without cracking from shrinkage while in the process of baking, and that the pores are finer and more numerous than is the case where water alone is used, thereby reducing the electrical resistance and increasing the resistance to the passage of the liquids respectively.

When the cups are to be placed in a battery which is to stand for a length of time before being put in circuit, I prefer to carbonize the hereinbefore described porous cups, which I do as follows: I saturate the cups with equal parts of molasses and water, and having dried them gently, I subject them to a high temperature, carbonizing the molasses within the pores of the cups and increasing their resistance to the passage of the exciting liquor without increasing the electrical resistance.

Having thus described my invention, what I claim, and desire to secure by Letters Patent of the United States, is—

1. The hereinbefore described process of manufacturing porous cups, which consists in moistening a suitable clay with water containing carbonate of ammonia in solution in molding the clay to a proper form, and in baking the clay thus molded, substantially as described.

2. The hereinbefore described process of manufacturing porous cups, which consists in moistening a suitable clay with a solution of carbonate of ammonia and carbonate of potassium in molding the moistened clay, and in baking the clay thus molded, substantially as described.

3. The hereinbefore described composition of matter for moistening clay used in the manufacture of porous cups, which consists of carbonate of ammonia, carbonate of potassium and water in the proportions specified, substantially as described.

In testimony whereof I affix my signature in presence of two witnesses.

FRANK G. CURTIS.

Witnesses:
C. MATHER,
CHARLES RICHARDSON.